United States Patent Office.

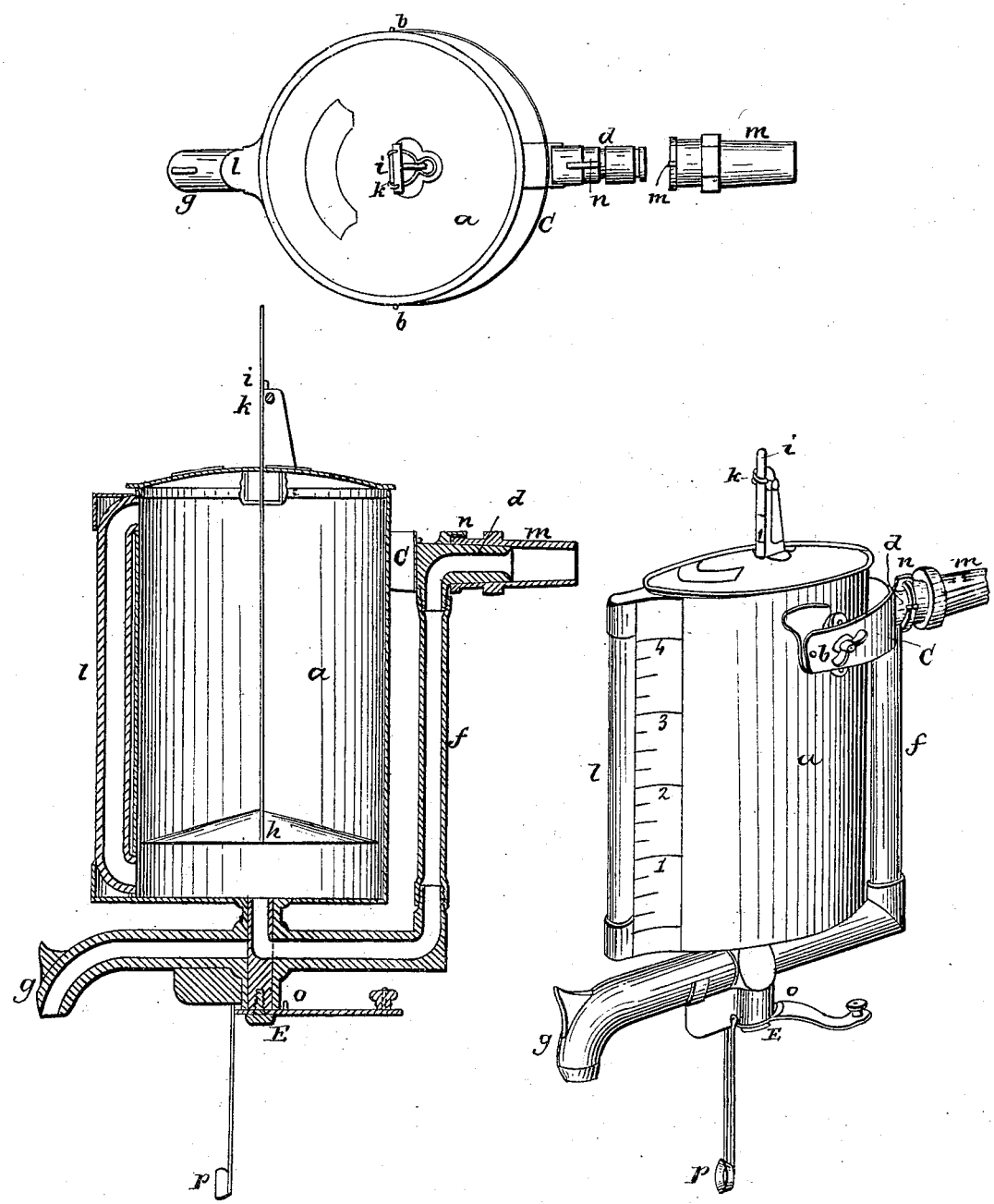

EDWARD G. SHORTT, OF CARTHAGE, NEW YORK.

Letters Patent No. 92,110, dated June 29, 1869.

IMPROVEMENT IN APPARATUS FOR MEASURING FLUIDS.

The Schedule referred to in these Letters Patent and making part of the same.

*To all whom it may concern:*

Be it known that I, EDWARD G. SHORTT, of Carthage, in the county of Jefferson, in the State of New York, have invented a new and improved Apparatus for Measuring Liquids; and I do hereby declare that the following is a full and exact description thereof, reference being had to the accompanying drawings, and to the letters of reference marked thereon, making a part of this specification.

The nature of my invention consists in providing an upright cylindrical cup or vessel, of uniform diameter, which is supplied with a hollow float, carrying a graduated stem, which rises above the vessel, and, by means of an index-point, designates the amount of liquid under the float; also a glass tube, with a graduated scale, graduated to correspond with the float, is attached to the front of the vessel, communicating with it at the extreme top and bottom, thereby giving a second measurement, or proof of the amount of liquid in the vessel.

Attached to the centre of the bottom of the vessel is a two-way cock, the opening in the core of which connects with the inside of the vessel. One of the other openings is formed into a faucet-jet, and the other is connected, by means of a flexible tube, with the barrel or tank, so that when the cock is turned in this direction, the liquid will flow down from the barrel, through the flexible tube, into the vessel, until the desired amount is indicated by the float and the glass tube; the cock is then turned around to the other side, thereby closing the connection with the barrel, and at the same time opening an escape for the liquid thus measured through the faucet-jet.

To enable others skilled in the art to make and use my invention, I will proceed to describe its construction and operation.

I construct, first, a cylindrical cup, or vessel, of uniform diameter, as shown at *a*, in the accompanying drawings, which is suspended by means of two ears, *b b*, near its upper part, hanging in the forked arm *c*, which is an extension of the hollow coupling *d*, by means of which the whole apparatus is attached to the barrel.

The two-way cock *e*, having its core-opening communicating with the vessel at the bottom, is connected on one side by the flexible tube *f*, with the hollow coupling *d*. On the other side it is formed into a faucet-jet, *g*, for the escape of the liquid after it is measured.

The cup is furnished with a hollow float, *h*, from which, rising up out of the vessel, is a graduated stem, *i*, which passes by the adjustable index-point *k*, and as this float always rests upon the surface of the liquid, the index-point will designate the amount thereof by the graduated stem. Also, the graduated glass tube *l*, which communicates both at the extreme top and bottom with the measuring-vessel, will indicate the amount of the liquid upon its scale, since the vessel always hangs, by its own weight, in a vertical position, and may be retained thus by the clamp-screw *x*.

In order to use my invention, the hollow plug *m* is to be screwed into the barrel or tank. This plug has a flange upon its outer extremity, through which is a notch, *m'*, which is to be left upon one side, as the plug is screwed into the barrel, to admit the hook *n* upon the hollow coupling. This hook fits over the flange, which, being of increasing breadth, as is shown in the drawings, tightens the hollow coupling as it is turned up, so that, with its rings of rubber packing *d*, the coupling is held to the barrel without danger of leakage.

When the handle of the two-way cock is turned back, the liquid flows from the barrel down through the flexible tube *f*, and in at the bottom of the vessel, until the index-point *k* and the glass gauge *l* indicate the desired measure; then, by turning the handle of the cock nearly around to the front, the connection with the barrel is closed, and an opening is made through the faucet-jet, for escape. After the liquid has run out, the handle may be turned still further to the front, when the cam *o*, on the handle, raises the stopper *p*, which covers the end of the faucet, and prevents dripping.

What I claim as my invention, and desire to secure by Letters Patent, is—

The combination of the hollow plug *m* with the hook and coupling *n*, attached to the trunnion-arms *c*, for supporting the measuring-vessel, and the flexible tube *f*, for connecting it with the barrel, all substantially as herein set forth.

EDWARD G. SHORTT.

Witnesses:
H. J. WELCH,
J. L. NORTON.